United States Patent [19]

Mortelmans

[11] Patent Number: 5,626,809
[45] Date of Patent: May 6, 1997

[54] METHOD FOR MAKING A FILM OF POLYVINYL BUTYRAL USED FOR MAKING LAMINATED GLASS

[75] Inventor: Johan F. Mortelmans, Lier, Belgium

[73] Assignee: Tale Consultants, T.D., Dublin, Ireland

[21] Appl. No.: 452,091

[22] Filed: May 26, 1995

[30] Foreign Application Priority Data

May 30, 1994 [BE] Belgium .............................. 09400534

[51] Int. Cl.$^6$ ........................ B32B 3/28; B29C 59/00
[52] U.S. Cl. ........................ 264/167; 156/87; 156/102; 264/210.5; 264/237; 264/284; 264/342 R; 264/348
[58] Field of Search .................. 156/102, 87; 264/210.5, 264/237, 284, 348, 210.4, 167, 288.8, 342 R, 342 RE

[56] References Cited

U.S. PATENT DOCUMENTS

| | | |
|---|---|---|
| 3,619,454 | 11/1971 | Sakata et al. .......................... 264/210.5 |
| 3,632,716 | 1/1972 | Fairbanks ................................ 264/237 |
| 3,694,537 | 9/1972 | Fairbanks . |
| 4,035,549 | 7/1977 | Kennar ..................................... 428/409 |
| 4,367,511 | 1/1983 | Crass et al. ............................. 264/210.5 |
| 4,452,840 | 6/1984 | Sato et al. ................................ 428/156 |
| 5,455,103 | 10/1995 | Hoagland et al. ....................... 156/102 |

FOREIGN PATENT DOCUMENTS

| | | |
|---|---|---|
| 0525403A1 | 2/1993 | European Pat. Off. . |
| 743052 | 1/1933 | France . |
| 449247 | 4/1968 | Switzerland . |
| WO92/03285 | 3/1992 | WIPO . |

Primary Examiner—Geoffrey L. Knable
Attorney, Agent, or Firm—Bacon & Thomas

[57] ABSTRACT

Method for making laminated glass, whereby a film (2) of polyvinyl butyral is applied between the glass layers (1) whose surface has obtained a roughness at a temperature above 120° C., whereby the glass layers (1) and the film (2) are pressed together at a considerably lower temperature so as to remove the air in between, after which the formed laminate is put in an autoclave under pressure and at a temperature higher than the temperature of the pressing together, characterized in that a film (2) of polyvinyl butyral is used which has elongated threadbare patches (3) which form levels on either side in the polyvinyl butyral surface which extend across the film (2) and which were provided at a lower temperature, however, than the temperature at which the roughness was formed, so that they will quickly disappear at a relatively low temperature because of the viscoelastic behaviour of the polyvinyl butyral, and in that these threadbare patches (3) are made to disappear after or already during the pressing together, but in any case before the laminate is put in the autoclave.

11 Claims, 2 Drawing Sheets

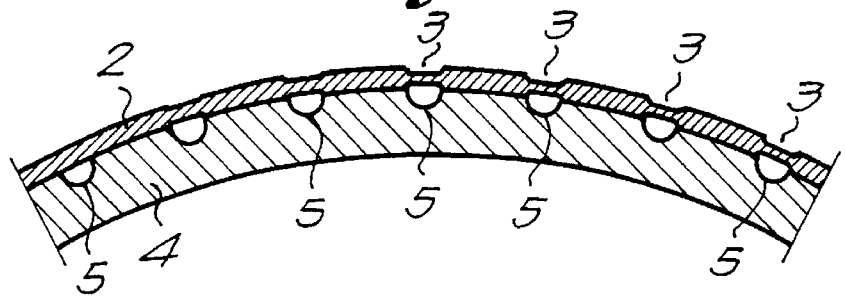
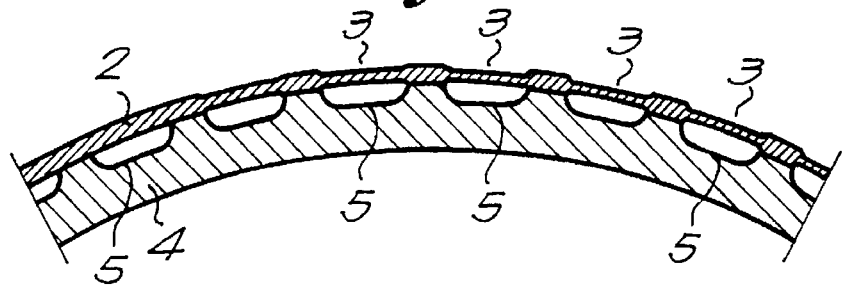
 
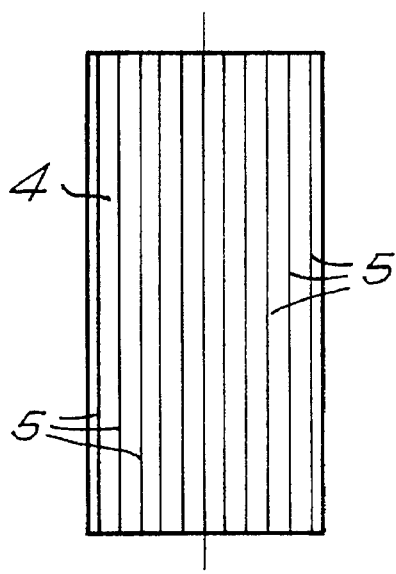 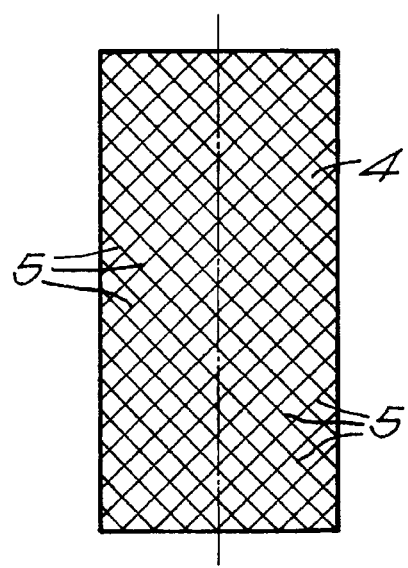

METHOD FOR MAKING A FILM OF POLYVINYL BUTYRAL USED FOR MAKING LAMINATED GLASS

The invention concerns a method for making laminated glass, whereby a film of polyvinyl butyral is applied between the glass layers whose surface has obtained its initial roughness at a temperature above 120° C., whereby the glass layers and the film are pressed together at a considerably lower temperature so as to remove the air in between, after which the formed laminate is put in an autoclave under pressure and at a temperature higher than the temperature of the pressing together.

It is clear that laminated glass, which has a large penetration resistance, must be entirely free of air bubbles. This is aimed for in that, during the pressing together, the air can escape because of the rough surface of the film of polyvinyl butyral. Thanks to the viscoelastic behaviour of the polyvinyl butyral, the roughness of the surface of the film will disappear in the autoclave, so that a transparent laminate is obtained in the end. If the laminate is air-free in the autoclave, the laminated glass will in principle also be free of air bubbles.

The problem consists in selecting the right roughness of the surface of the polyvinyl butyral film. If this roughness is too inferior, the de-aeration will not be complete enough. The edges of the laminate are sealed too quickly and the laminate which is put in the autoclave still contains air. Small amounts of air can be absorbed by additives in the polyvinyl butyral, but larger amounts of air produce air bubbles in the end product. Moreover, the de-aeration is very slow. If the roughness is too great, however, the edges of the laminate are not sufficiently sealed when it is put in the autoclave and air can penetrate between the glass layers in the autoclave, which also produces air bubbles in the end product.

The invention aims to remedy this disadvantage and to provide a method for making laminated glass which is relatively fast, but still considerably restricts the risks of air bubbles in the laminated glass.

This aim is reached according to the invention because a film of polyvinyl butyral is used which has longitudinal thinned patches which form recessed levels on either side in the polyvinyl butyral surface which extend across the film and which were provided at a lower temperature, however, than the temperature at which the roughness was formed, so that they will quickly disappear at a relatively low temperature because of the viscoelastic behaviour of the polyvinyl butyral, and because these additional thinned patches are made to disappear after or already during the pressing together, but in any case before the laminate is put in the autoclave.

Since during the pressing together, the air can very easily escape via the recessed levels or grooves in the surface, the de-aeration can take place very quickly, also when the original roughness is relatively small. In any case, this roughness can be selected such that no air can penetrate in the autoclave between the glass layers. The thinned patches which guarantee the complete de-aeration have already entirely disappeared before the insertion in the autoclave.

A film can be used with parallel thinned patches which are significantly narrower than the distance in between them, so that it has a grooved surface as it were, or a film with parallel thinned patches which are about as wide as the distance in between them, and which thus has a fluted surface, or also a film with parallel thinned patches which are significantly larger than the distance in between them, and which thus has a ribbed surface as it were.

The film of polyvinyl butyral which is used can have one series of parallel thinned patches as well as two crossing series of parallel thinned patches.

The invention also concerns a method for treating a film of polyvinyl butyral which is fit to be used with the method for making laminated glass according to any of the preceding embodiments.

Thus, the invention concerns a method for treating a film of polyvinyl butyral, whereby the surface is made rough or roughened at a temperature above 120° C., and which is characterized in that the film is guided at a temperature between 50° and 120° C. over a revolving cooled roller provided with grooves and in that thinned patches are formed in the film due to the difference in cooling rate opposite and next to these grooves.

A cooled roller can be used with grooves on its surface which run parallel to the axis of rotation of the roller or grooves which form an angle in relation to this axis of rotation or also with two series of grooves crossing one another.

The width of the grooves can be comprised between 0.5 and 20 mm and can be smaller than, equal to or larger than the mutual distance between the grooves.

In a special embodiment, the film is fed to the cooled roller at a temperature between 70° and 90° C.

The temperature of the film fed to the roller can be obtained by heating, but the film can also be guided over the roller at a higher temperature immediately following the extrusion, and cooled off to a temperature between 50° and 120° C. before it reaches the roller.

In a practical embodiment, the roller is cooled, so that the temperature of the film drops below 40° C.

Other particularities and advantages of the invention will become clear from the following description of a method for making laminated glass and a method for testing a film of polyvinyl butyral used thereby, according to the invention. This description is given as an example only and does not limit the invention in any way. The figures of reference concern the accompanying drawings, in which:

FIG. 1 shows a section of laminated glass made according to the invention;

FIG. 2 schematically shows a section of a device during the manufacturing of a film of polyvinyl butyral according to the invention;

FIG. 3 shows the detail indicated in FIG. 2 by F3 to a larger scale;

FIG. 4 shows a section of a part of a film of polyvinyl butyral obtained by means of the method according to the invention;

FIG. 5 shows a top view according to the arrow F5 in FIG. 2 of the roller of the device in FIG. 2;

FIG. 6 shows a section analogous to that in FIG. 3 of a part of the device used for the application of the method, but with reference to another embodiment of the invention;

FIG. 7 shows a section of the film of polyvinyl butyral obtained with the device from FIG. 6;

FIG. 8 shows a top view according to the arrow F5 in FIG. 2 of the roller of the invention, but with crossing grooves.

Figure 1:
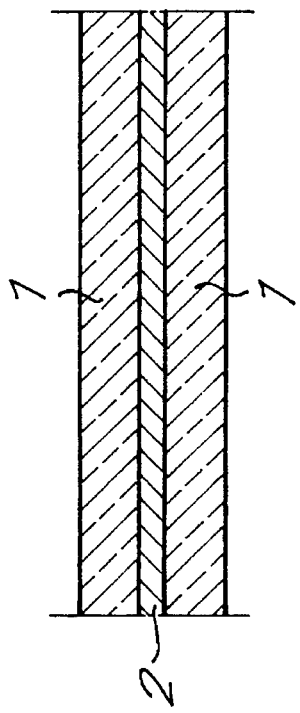

As represented in FIG. 1 laminated glass contains glass layers 1 which are glued together with a thinner intermediate layer formed of a film 2 of polyvinyl butyral.

This laminated glass is made in the usual manner by placing this film 2 in between the two glass layers 1, by heating the thus formed sandwich up to about 50° C. and then pressing it together so as to remove the air between the glass layers 1 and the film 2, and by subsequently putting the whole in an autoclave with a pressure of 12 to 14 bar and a temperature of about 140° C.

In order to improve the de-aeration, the surface of the film 2 is made rough on either side at a temperature between 170° and 210° C. This roughening can also be carried out during the extrusion itself which takes place at for example 210° C.

Polyvinyl butyral has a particular viscoelastic behaviour. Provided reliefs disappear automatically and all the faster as the temperature is reached at which the relief was provided.

The extruded film is normally conserved at a temperature below 10° C., so that the roughness is still present during the pressing together in view of the de-aeration. The de-aeration by pressing together is carried out at such a temperature that at the end of the pressing together, the high tops of the surface of the film 2 have disappeared and the edges of the laminate are sealed. In the autoclave, the film is heated such that the rest of the roughness of the surface of the film disappears and the glass layers 1 stick together and any relief of the film has disappeared and this film is perfectly transparent.

Characteristic of the invention is that on top of the initial roughness, at a temperature which is significantly lower than the temperature at which the roughness was obtained, thinned patches 3 are provided which extend parallel to one another from one edge to the opposite edge.

Figure 2:
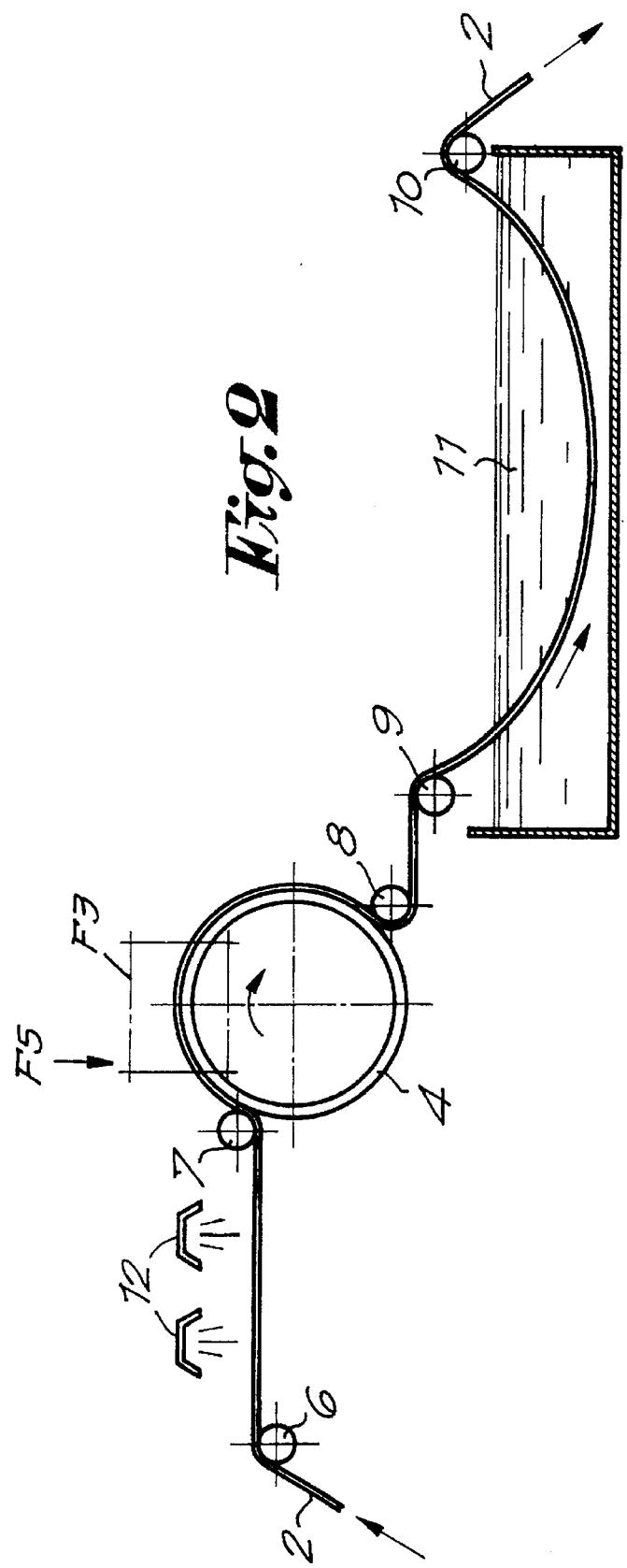

These thinned patches 3 are obtained, as represented in the FIGS. 2 and 3, in a simple manner by guiding the film 2 which has an initial rough surface on either side, at a temperature between 50° and 120° C. and preferably between 70° and 90° C., over a hollow roller 4 provided with grooves 5 and which is cooled by means of a coolant, so that the temperature of the film 2 cools off below 40° C. and preferably to 35° C.

In order to cool down sufficiently fast, a coolant such as ethylene glycol is used at a temperature of −2° to −4° C., so that the wall of the roller 4 itself has a temperature between 2° and 4° C. If the fed film 2 is cold, it can be heated up to the required temperature into a plastic condition with for example infrared heaters 12 between a guide roller 6 and the roller 4. Advantageously, the film 2 is cooled just enough after the extrusion and is then fed directly to the roller 4 in plastic condition.

In order to obtain a good contact of the film 2 with the surface of the roller 4 over slightly more than 180 degrees, the film 2 is guided over two pressure rollers 7 and 8. Preferably, the speed of the pressure roller 7 is selected such that a small tensile stress is created in the film 2 and the speed of roller 8 is also somewhat higher than the speed of roller 7 in order to make the obtained thinned patches 3 deeper. Between two additional guide rollers 9 and 10, the film can be cooled further in a bath 11 to a temperature of 10° C. at which the film 2 is further conserved until it is put in the autoclave.

Due to the cooling on the roller 4, the film 2 will cool off and shrink. Said cooling will go faster there where the film 2 makes contact with the material of the roller 4 than opposite the grooves 5 in which air is contained. As a result, the film 2 will harden faster there where it makes contact with the cold surface of the roller 4. As the length and the width of the film 2 is fixed because of the friction on the roller 4, the volumetric shrinkage will be obtained practically entirely by a reduction of the thickness of the film 2. This reduction in thickness will mainly occur opposite the grooves 5 since the film 2 is still hot there, whereas it is already cold and hard where it is in contact with the cooling surface in between the grooves 5. The fast cooling, shrinking sections which make contact with the surface of the roller 4 will stretch out the sections situated on top of the grooves 5 which are still warm and which are separated from the roller 4 by means of an air layer. This has for a result that the surface of the parts of the film 2 with a smaller thickness will be recessed as compared to the strongly cooled parts situated next to it.

When the film 2 comes off the roller 4, it will consequently have the thinned patches 3 which are still warm and which, if necessary, may be stretched even more by means of the roller 8 and consequently become thinner such that the thinned patches 3 become deeper. This is represented in FIG. 4. These thinned patches 3 form ducts along which the air can escape during the pressing together.

The width of the grooves 5 and thus also of the thinned patches 3 is comprised between 0.5 and 20 mm and preferably between 1 and 3 mm, whereby the distance between the grooves 5 or between the thinned patches 3 is considerably larger.

Because the thinned patches 3 have been created at a relatively low temperature, these thinned patches will also disappear very quickly at relatively low temperatures. At the beginning of the pressing together the thinned patches 3 are still present and allow for a very fast and good de-aeration, but immediately thereafter they disappear due to the viscoelastic character of the polyvinyl butyral as a result of the temperature at which the pressing together is carried out. At a temperature of about 50° C., these thinned patches 3 in any case disappear very quickly. In this way, all the thinned patches 3 have already disappeared when the film 2 is put in the autoclave.

The invention will be further explained by means of the following practical example:

A film 2 of polyvinyl butyral in plastic condition heated up to a temperature of 80° C. was guided at a linear speed of 10 m per minute over a cooled roller 4 with a diameter of 601 mm and pulled away from the cooled roller 4 with a speed of 10.1 m/min. by the roller 8. On its chromium-coated surface, the roller 4 was provided with 189 grooves 5 of 2 mm wide and 2 mm deep and with an intermediate distance of 10 mm. The roller was cooled by means of glycol of −2° C., so that the temperature of the surface was 4° C. After the cooling, the film 2 was guided through a bath 11 with cold water so as to further cool it to 10° C. and so as to compensate for the loss of moisture in the film 2. The resulting film is represented in FIG. 4.

After the last-mentioned film 2 was placed in an oven at 50° C. during one minute, the thinned patches 3 disappeared for over 80%, which proves that after assisting the de-aeration, these thinned patches disappear, so that, in the autoclave no air can penetrate via the edges in the laminate.

It is clear that both the width of the grooves 5 and the distance in between them are not necessarily limited to the above-described values. According to a variant to which FIGS. 6 and 7 refer, the width of the grooves 5 is considerably larger than their intermediate distance, which intermediate distance is situated between 1 and 3 mm. As a result, the surface of the roller 4 looks rather as a ribbed than as a grooved surface. In the embodiment represented in FIG. 8, the roller 4 is not provided with one series of parallel grooves 5, but with two crossing series of grooves 5 which moreover each form an angle of about 45 degrees with the longitudinal direction of the roller 4. A film 2 is obtained whereby the thinned patches 3 are situated crosswise and provide for an even better air extraction.

According to yet another variant, the distance between the grooves 5 can be equal to the width of the grooves 5, so that the surface of the roller 4 is fluted as it were. Said width is practically comprised between 2 and 6 mm. Also the obtained film 2 will have a fluted look, whereby the pits of the flutes will be thinner than the tops.

In order to make laminated glass with a thicker polyvinyl butyral intermediate layer, two or more films can be provided between the two glass layers 1. In this case, the thinned patches 3 could be coincidentally situated right on top of one another in successive films 2, which would cause undesired optical effects. In order to avoid this, the grooves 5 can be provided not parallel to the axis of the roller 4 but at a small angle in relation to the axis, so that also the thinned patches 3 can form such a small angle in relation to the cross direction of the film 2. Successive films 2 are placed with the slopes of the thinned patches in the opposite sense.

During the pressing together, the thinned patches 3 allow for a better and faster de-aeration. Since they have already disappeared by the time the laminate is put in the autoclave, they do not influence the further processing. Laminated glass can thus be manufactured faster than with the known methods and the risk of air inclusions in smaller.

The invention is by no means limited to the above-described embodiments and, within the scope of the patent application, many changes can be made to these embodiments.

I claim:

1. Method for treating a film of polyvinyl butyral, whereby its initial surface roughness was obtained at a temperature above 120° C., characterized in that the film (2) is guided at a temperature between 50° and 120° C. over a revolving cooled roller (4) provided with grooves (5) and in that thinned patches (3) are made in the film due to the difference in cooling rate opposite the grooves (5) and on the cooling surfaces in between the grooves.

2. Method according to claim 1, characterized in that a cooled roller (4) is used with grooves (5) on its surface which run parallel to the axis of rotation of the roller (4).

3. Method according to claim 1, characterized in that a cooled roller (4) is used with two series of grooves (5) crossing one another.

4. Method according to claim 1, characterized in that a cooled roller (4) is used with parallel grooves (5) which form a small angle in relation to the longitudinal direction of the roller (4).

5. Method according to claim 1, characterized in that a cooled roller (4) is used with grooves (5) whose width is comprised between 0.5 and 20 mm.

6. Method according to claim 5, characterized in that a cooled roller (4) is used with grooves (5) whose width is smaller than the distance between successive grooves and where the groove width is situated between 1 and 3 mm.

7. Method according to claim 5, characterized in that a cooled roller (4) is used with grooves (5) whose width is larger than the distance between successive grooves (5) and which distance is situated between 1 and 3 mm.

8. Method according to claim 5, characterized in that a cooled roller (4) is used with grooves (5) whose width is equal to the distance between successive grooves (5) and which is situated between 2 and 6 mm.

9. Method according to claim 1, characterized in that the film (2) is fed to the cooled roller (4) at a temperature between 70° and 90° C.

10. Method according to claim 1, characterized in that the roller (4) is cooled such that the temperature of the film (2) drops below 40° C.

11. Method according to claim 1, characterized in that the film (2) is pulled away from the rotating cooled roller (4) under tension in order to make the formed thinned patches (3) thinner and consequently increase the depth of the recessed areas or grooves in the film surface.

* * * * *